United States Patent

Maeda

[11] 3,907,403
[45] Sept. 23, 1975

[54] FIBRE-OPTICS FACEPLATE OBSERVABLE WITH HIGH-INTENSITY AMBIENT ILLUMINATION

[75] Inventor: Haruo Maeda, Kadoma, Japan

[73] Assignee: Matsushita Electric Industrial Co., Ltd., Kadoma, Japan

[22] Filed: June 18, 1974

[21] Appl. No.: 480,364

Related U.S. Application Data

[63] Continuation-in-part of Ser. No. 286,263, Sept. 5, 1972, abandoned, which is a continuation of Ser. No. 56,894, July 21, 1970, abandoned.

[30] Foreign Application Priority Data

July 28, 1969  Japan.............................. 44-60684

[52] U.S. Cl............. 350/96 B; 350/276 R; 313/372
[51] Int. Cl.²............................................ G02B 5/16
[58] Field of Search...... 350/96 B, 276 R, 164, 165, 350/188; 313/372, 475

[56] References Cited
UNITED STATES PATENTS 2,364,369  12/1944  Jelley et al...................... 350/164 X
2,612,612  9/1952  Szegho et al................ 350/276 R X
3,253,500  5/1966  Hicks.................................. 350/96 B

*Primary Examiner*—David H. Rubin
*Attorney, Agent, or Firm*—Depaoli & O'Brien

[57] ABSTRACT

A fibre-optics faceplate for displaying an optical image of high image contrast that is suitable for visual observation under high-intensity ambient illumination. The faceplate is a bundle of side-by-side optical fibres, each having a core with a low numerical aperture of below about 0.4, cladding therearound having an index of refraction less than that of the core, and a light-absorbent glass layer around the cladding. The outer surface of the bundle is roughened and has a coating thereon with an index of refraction less than that of the cores. The inner surface has a fluorescent material thereon for emitting optical signals by application thereto of electrical signals.

3 Claims, 4 Drawing Figures

INVENTOR
HARUO MAEDA

FIBRE-OPTICS FACEPLATE OBSERVABLE WITH HIGH-INTENSITY AMBIENT ILLUMINATION

CROSS-REFERENCES TO RELATED APPLICATIONS

This application is a continuation-in-part of application Ser. No. 286,263, filed on Sept. 5, 1972, and now abandoned, by Haruo Maeda, and entitled "Fibre-optics Faceplate for Optical System," which is a continuation of application Ser. No. 56,894, filed on July 21, 1970 by Haruo Maeda and similarly entitled "Fibre-optics Faceplate for Optical System," and now abandoned.

BACKGROUND OF THE INVENTION

1. Field of the Invention

The present invention relates to an optical system for imaging optical signals and in particular to a fibre-optics faceplate for use in the optical system. It specifically relates to reflection-reducing and contrast-enhancing means for optical systems which are observed visually under high-intensity ambient lighting conditions.

2. Description of the Prior Art

Fibre-optics plates, formed of a bundle of optical fibres, are employed as the faceplate of the viewing screen in cathode-ray tubes, image tubes, and other photoelectric converting devices through which optical signals such as two-dimensional pictures are effectively transferred. These transferred signals can then be directly observed on the faceplate by an observer. Typical of the important applications of fibre-optics faceplates is image recording on a cathode-ray tube screen and visual display in image tubes. This invention is directed to visually displayed image tubes. The advantage of such applications results from the high photometric efficiency of transmission and the controllability of the numerical aperture.

Numerical aperture is an important parameter, especially in effecting light transmission of an optical fibre, and therefore its value should be chosen meticulously in accordance with the performance characteristics of the input light employed and output light desired. Where a diffusive light source such as a fluorescent material is used in contact with the faceplate, a high numerical aperture should be chosen to obtain optimum transmission of light, for example, for image tubes in which low light intensity is solely obtainable. In cathode-ray tubes, moreover, it is desirable to pick up as much light as possible from its fluorescent layer.

If higher image contrast is required in these instances, on the other hand, a lower numerical aperture may be chosen in order to reduce reflection of the ambient light. In conventional fibre-optics cathode-ray and image tubes, for example, it is usual to employ a fibre-optics faceplate having a low numerical aperture in order to eliminate the amount of ambient light that is incident as a noise on the fluorescent layer. Thus, signal waveforms and picture images with high contrast ratio can be obtained on these screens even though they are exposed to high ambient illumination.

The outer surfaces of a conventional fibre-optics faceplate, such as that described in U.S. Pat. No. 3,253,500 by Hicks et al., are so smooth or optically flat that most of the incident light may be reflected thereat even though a selected aperture angle is provided for transmittal of the entering light from end to end of the fibres. When images on the faceplate with a smooth outer surface are observed from the front thereof under conditions of high-intensity ambient illumination, moreover, the outer surface looks like a dark mirror from which the image of the observer himself is reflected to disturb a clear observation of the image thereon, even if the numerical aperture of the fibre-optics faceplate is sufficiently small. If the faceplate is observed obliquely in order to avoid this undesirable reflection of ambient light, the effective viewing area of the faceplate is significantly limited.

In attempts to solve this reflection problem, U.S. Pat. No. 2,612,612 of Szegho et al. teaches roughening of the viewing plate in order to reduce reflectivity and provide increased contrast range without sacrifice of picture detail, and U.S. Pat. No. 2,364,369 of Jelley et al. discloses a glass plate with a front-surface roughness having an interference layer thereon which must be no more in thickness than one-quarter or an odd multiple of the wave lengths of the ambient light. The aforementioned Hicks el al. patent also teaches doubly cladding the optical fibers with the outer cladding layer being at least partially light absorbent.

However, these reflection-reducing means have not been sufficiently effective to enable a small television screen to be used outdoors under conditions of strong daylight illumination without significant loss of contrast, probably because neither a roughened front surface, nor an interference coating thereon, nor double cladding of the fibers has been sufficient to minimize strong ambient light that is incident upon the fibre-optics faceplate. Consequently, because small, easily transportable television sets are frequently used out of doors in daylight, a need for effective contrast enhancement and reflection abatement continues to exist.

SUMMARY OF THE INVENTION

It is an object of the invention to provide a novel fibre-optics faceplate, for cathode-ray tubes, image tubes, and like photo-electric converting devices, which is formed of a bundle of optical fibres and on which the optical signals applied are directly observable even at high-intensity ambient illumination.

According to this invention, a combination of means is herein provided for avoiding the effects of high-intensity ambient light and for enhancing contrast in the presence of such light. This combination comprises a light scattering means for ambient light penetrating to the rear or inner surface of a bundle of side-by-side optical fibers forming an optical face-plate, a light absorption means for ambient light passing through these optical fibers as skew rays and as scattered light, and a minimizing means for ambient light that is incident upon the front or outer surface of the bundle of optical fibers.

The light scattering means comprises a fluorescent layer as a coating on the inner surface of the bundle. The light absorption means comprise claddings enveloping the cores of each of the optical fibers and having an index of refraction that is lower than the selected index of refraction of the cores, whereby scattered ambient light in the cores is partially reflected outwardly and glass layers, surrounding the cladding, which have light absorption capability for this outwardly reflected light. The minimizing means comprises:

1. a numerical aperture of up to about 0.4 for the bundle that defines a relatively narrowed viewing an gle, increases internal reflections by the claddings, and improves image contrast, 2. a coarse finishing of the front surface that randomly scatters the incident ambient light, and 3. a transparent coating which covers the coarse-finished front surface, this coating having a refractive index that is lower than the selected refractive index of the cores and having a range of transparency selected in consideration of the relationship between the wavelength characteristic of the light emitted from the fluorescent layer and the spectral sensitivity of an observer's eyes, whereby interference of the ambient light with the image is minimized and the narrowed viewing angle is widened.

According to the invention, the front or outer surface of a fibre-optics faceplate, as a bundle of doubly clad optical fibers having a fluorescent layer as the rear surface thereof, is coarsely finished mechanically or chemically, whereby mirror reflection at the front surface is substantially prevented and contrast-reducing background light is effectively suppressed. The finishing of the fibre-optics faceplate may be carried out, for example, by sand-blasting, grinding, or chemical etching. Preferable degree of surface roughness, or the average value of center-to-center spacing of protuberances on the surface, ranges substantially from 2 to 60 microns.

The rough or finely concave-convex surface is thereafter coated with a transparent material having a refractive index lower than that of the cores of the fibre-optics bundle. The thickness of a reflection-reducing coating should not exceed the average center-to-center spacing of the protuberances. The surface of the coating should substantially follow the contour line of the profile of the protuberances. This provides an effective radiation from the faceplate that is available in the direct observation of the displayed images.

Other objects and advantages of the invention will become apparent from the following description perused in connection with the accompanying drawings.

DESCRIPTION OF THE PREFERRED EMBODIMENTS

Figure 4:
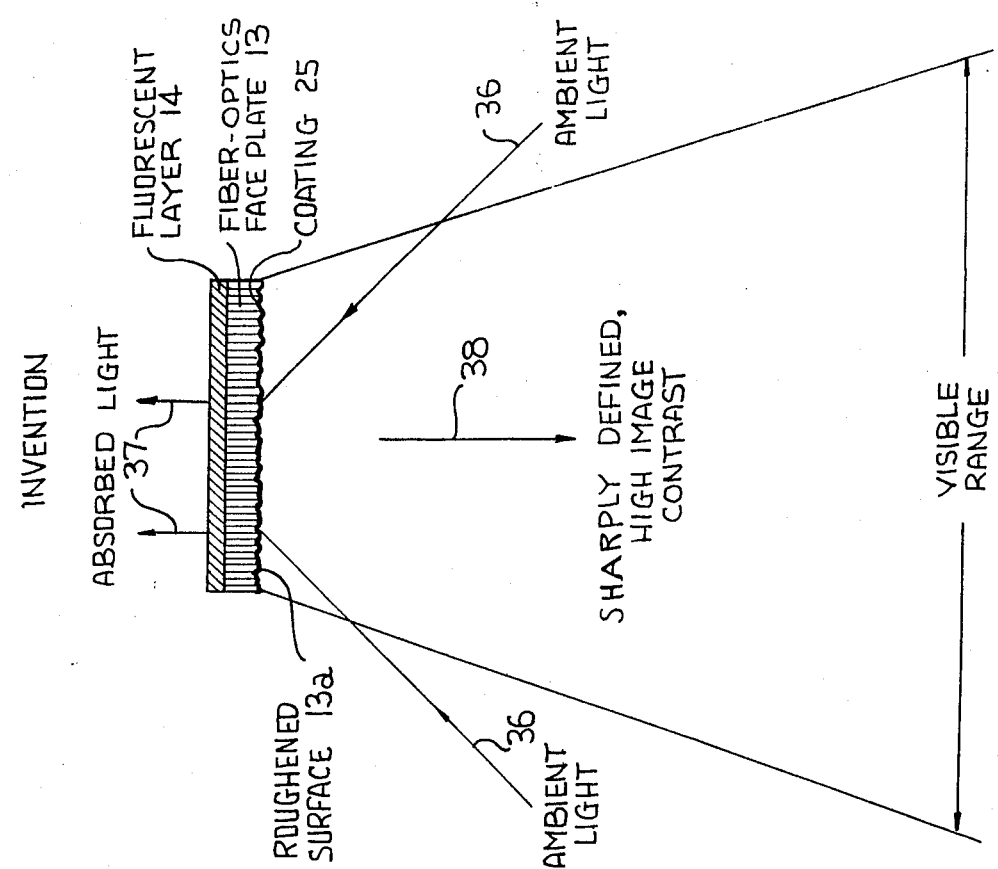
FIG. 4 illustrates the light-reflecting characteristics of the roughened and coated fibre-optics screen of this invention while exposed to ambient light.
Figure 3:
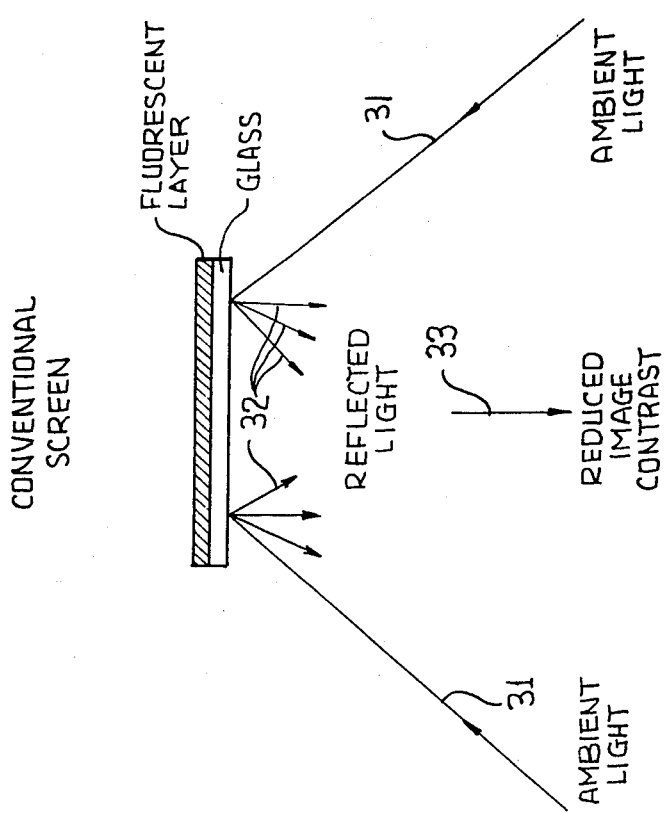
FIG. 3 illustrates the light-reflecting characteristics of a roughened conventional screen while exposed to ambient light.

A general comparison of the prior art screens with the viewing screens of this invention is furnished in FIGS. 3 and 4. Ambient light 31 becomes reflected light 32 which provides reduced contrast 33 in the conventional viewing screens of FIG. 3, but ambient light 36 becomes inwardly directed and absorbed light 37 in the viewing screen of this invention, whereby a sharply defined image 38 of high contrast is obtained, as illustrated in FIG. 4.

Figure 1:
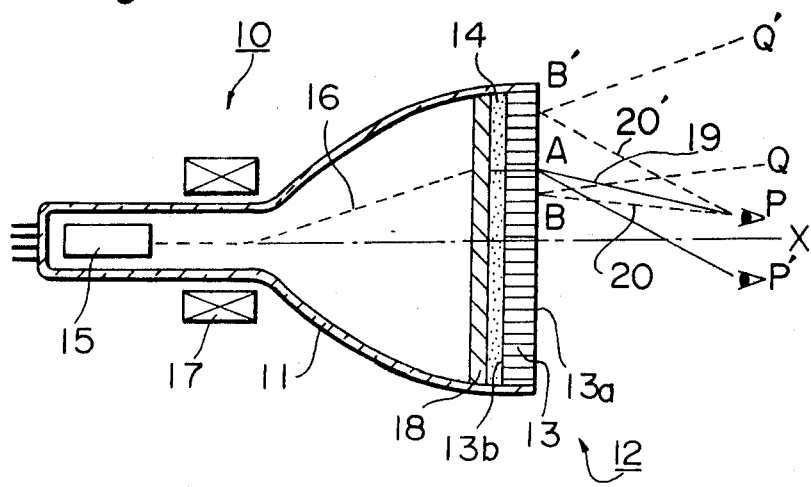
FIG. 1 is a longitudinal sectional view of a conventional cathode-ray tube with which a fibre-optics faceplate implementing the invention is to be combined.

In FIG. 1, a cathode-ray tube 10 comprises an evacuated glass envelope 11, a screen 12 provided with a fibre-optics faceplate 13 made of a bundle of optical fibres and with a fluorescent layer 14 deposited on the inner surface of the bundle, an electron gun 15 for emitting an electron beam 16, and scanning means 17 for focusing and deflecting the electron beam 16. A metal backing 18 may be disposed at the back of the fluorescent layer 14. One end of each of the optical fibres in the fibre-optics bundle forms an outer surface 13a of the screen 12 and the other end forms an inner surface 13b which is coated with the fluorescent layer 14.

When the electron beam 16 impinges through the metal backing 18 onto the fluorescent layer 14, diffusive light rays are emitted therefrom. After travelling through the fibre-optics faceplate 13, the light rays are radiated into the ambient medium such as atmospheric air within an angle defined by the numerical aperture of the fibre-optics bundle. As illustrated in FIG. 1, the light rays thus radiated from point A are observed at a view point P in the light path 19.

At a high ambient illumination, however, difficulties are encountered in that the ambient light rays from external light sources Q and Q' are reflected respectively at points B and B' around the point A. Thus, the ambient light rays advancing through light paths 20 and 20' interfere with the ray passing through the path 19. As is well known, this interference can be avoided to some degree by the use of the fibre-optics faceplate 13 having a low numerical aperture and adapted to increase the image contrast observable on the screen 12.

Figure 2:
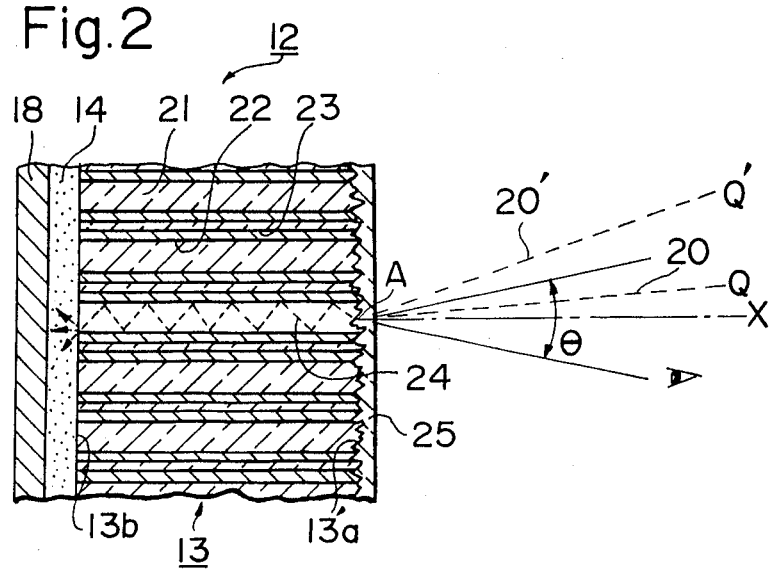
FIG. 2 is a fragmentary sectional view, on an enlarged scale, of the fibre-optics faceplate shown in FIG. 1.

FIG. 2 shows a construction arrangement of the fibre-optics faceplate used in the cathode-ray tube embodying the invention, wherein the metal backing and the fluorescent layer are also designated by numerals 18 and 14, respectively. The screen 12 is provided with the fibre-optics faceplate 13 in which the fibre-optics bundle is composed of cores 21, claddings 22 enveloping the respective cores 21, and absorbing glass layers 23 disposed between the clad cores 21. These cores 21 and claddings 22 are bundled together with the absorbing layers 23 to form a multiple fibre-optics faceplate 13. The fibre-optics bundle of the faceplate 13 has a numerical aperture below 0.4 so as to provide a high image contrast. This low numerical aperture affords to the screen 12 a narrow region of view, such as a small visual angle, and thereby shuts out at least a portion of the ambient light, as from the more obtusely located source Q', for example.

When an ambient light ray coming along the path 20 from the diffusive light source Q located within the small visual angle $\theta$ falls on the point A of the outer surface 13a', a minor portion of the light is scattered at the point A but the major portion enters one of the cores 21 via a zigzag path 24 shown as a dotted line. The conducted light rays are scattered when they arrive at the fluorescent layer 14 and thereafter are absorbed by the absorbing layers 23. When, on the other hand, other light rays, emanating from the light source Q' located outside of the visual angle $\theta$, fall on the point A through the path 20', a minor portion of the light rays is also reflected at the point A, and the remaining major portion enters, as skew rays, one of the cores 21 and is absorbed both by the claddings 22 and by the absorbing layers 23 near the point A. Since most of the ambient light rays coming from both the sources Q and Q' are absorbed in this manner, the resultant image contrast increases without being affected by the ambient illumination.

Since the surfaces of the existing screen faceplates are usually finished smooth, they also act like a mirror inviting light reflection of the ambient light rays. In particular, under luminous ambient light conditions, the conventional smooth surface 13a of the screen 12 is observed as a dark mirror reflecting the observer himself thereon. Even though the view point P is shifted to a point P', which is displaced from the optical axis X in order to avoid such mirror reflection, the smooth surface also acts as a mirror and additionally provides a narrower region of observation than the total region which would be obtainable on the optical axis X.

In this instance, an outer surface 13a' of the faceplate 13 is made so rough that various ambient light rays incident thereon may be randomly reflected and that the above-mentioned mirror reflection may not occur. The rough outer surface 13a' can be obtained as a result of finishing by sand-blasting rough grinding, or chemical etching methods. Thus, the outer surface 13a' of the faceplate of the invention is seen from an external view point as a dark frosted surface.

In order to increase the efficiency of the light emitted from the fluorescent layer 14, the rough surface 13a' is coated with a transparent inorganic or organic material 25, such as water, oil including grease, or plastics. These selected materials have refractive indices lower than that of the cores of the optical fibres and possess low vapor pressures compared with the atmospheric pressure at ambient temperatures for normal outdoor use. The range of transparency of the coating material 25 should be selected in consideration of the relationship between the wavelength characteristic of the light emitted from fluorescent layer 14 and the spectral sensitivity of the observer's eyes. The coating 25 is preferably not as thick as shown in FIG. 2 and should not exceed the center-to-center spacing of the protuberances of the roughened surface 13a'.

When the light rays radiate from the outer surface 13a' of the screen 12 to the open air, the coating material 25 serves to reduce the undesirable reflection which would otherwise occur at the rough surface 13a', providing efficient direct observation of the image thereon. As a result, the amount of light rays returned into the cores 21 is substantially reduced to a minimum. This is due to the low refractive index of the coating materials 25, and therefore, the radiation efficiency of the light rays is increased in order to provide a high image contrast under direct observation even at a high ambient illumination. In addition, the visual angle of such fibre-optics faceplate is greater than that of the faceplate without the coating material.

This invention, in summary, reduces the amount of ambient light reflected on the viewing screen of a fibre-optics faceplate by roughening the front surface of the bundle of fibers in the faceplate, whereby image contrast is reduced and a sharply defined image cannot be obtained because the roughened surface disperses the image and the reflected light in all directions towards the viewer. Then the invention adds to the roughened surface a transparent coating thereover which has a refractive index lower than that of the cores of the fibers in the fibre-optics faceplate and a selected range of transparency so that the undesirable reflections from the roughened surface are reduced, the amount of ambient light refracted to the cores is minimized, and the visual viewing angle is increased. Then to minimize interference from ambient light that does enter the cores, the fibers in the bundle are composites which are formed as cores having a low numerical aperture below about 0.4, claddings therearound having an index of refraction lower than that of the cores, and a glass absorbing layer around and between the claddings so that inwardly reflected ambient light, such as skew rays, tend to be reflected outwardly and absorbed in this layer. Finally, the invention comprises a fluorescent layer on the inner surface of the bundle of fibers, whereby whatever ambient light does travel inwardly along the cores is caught and returned to the claddings and absorbing glass to be absorbed.

This combination of scattering, absorption, and minimizing means for ambient light of high-intensity, such as strong daylight, creates a viewing screen of a cathode-ray tube, for example, which is nearly black when a signal is not being transmitted and further creates such high contrast without reflection of ambient light that a miniature television screen, for example, is easily usable out-of-doors.

The fibre-optics faceplate of this invention is accordingly useful under conditions of high-intensity ambient illumination in a variety of applications, for example, in cathode-ray tubes and image tubes used for closed-circuit television receivers near blast furnaces, electric furnaces, and kilns and for miniature television receivers used in desert areas, on ski slopes, and on beaches.

Although the present invention has been described in connection with one particular embodiment, modifications which will be apparent to those skilled in the art are included within the scope of the invention.

What is claimed is:

1. A fibre optics faceplate having a nearly black surface, for displaying an optical image of high contrast under high-intensity ambient illumination conditions, comprising:
   A. a screen formed of a bundle of side-by-side optical fibres, comprising cores having a selected index of refraction, claddings enveloping each of said cores, and absorbing glass layers disposed between said clad cores, said bundle having an outer surface and an inner surface at the opposed ends of said fibres;
   B. as a light-scattering means for ambient light passing through said cores from said outer surface, a fluorescent layer as a coating on said inner surface;
   C. a minimizing means for ambient light that is incident upon said dark surface, comprising:
      1. a numerical aperture of up to about 0.4 for said bundle that defines a relatively narrowed viewing angle, increases internal reflections by said claddings, and improves image contrast,
      2. a coarse finishing of said outer surface that scatters randomly said incident ambient light, and
      3. a transparent coating which covers said coarse finished outer surface, said coating having a refractive index lower than said refractive index of said cores and having a range of transparency selected in consideration of the relationship between the wavelength characteristic of the light emitted from said fluorescent layer and the spectral sensitivity of an observer's eyes, whereby interference of said ambient light with said image is minimized and said narrowed viewing angle is widened; and D. a light absorption means for said randomly scattered ambient light entering said cores through said transparent coating and for said ambient light scattered back into said cores by said fluorescent layer, comprising:
1. an index of refraction for said claddings that is lower than said selected index of refraction, whereby said scattered ambient light in said cores is partially reflected outwardly, and
2. light absorption capability in said absorbing glass layers for absorbing said outwardly reflected ambient light passing through said claddings.

2. The faceplate according to claim 1, wherein said coating comprises a grease.

3. The faceplate according to claim 1, wherein said coating comprises a plastic.

* * * * *